United States Patent [19]
Thomas et al.

[11] Patent Number: 5,943,867
[45] Date of Patent: Aug. 31, 1999

[54] REFRIGERANT RECLAMATION SYSTEM

[75] Inventors: James V. Thomas; Kenneth Garfield Ross, both of Nova Scotia, Canada

[73] Assignee: Refrigerant Services Inc., Dartmouth, Canada

[21] Appl. No.: 08/968,571

[22] Filed: Nov. 12, 1997

[51] Int. Cl.⁶ .................................................. F25B 43/04
[52] U.S. Cl. ................................ 62/85; 62/77; 62/475
[58] Field of Search ..................... 62/77, 84, 85, 62/474, 475

[56] References Cited

U.S. PATENT DOCUMENTS

| | | |
|---|---|---|
| 4,856,289 | 8/1989 | Lofland . |
| 4,856,290 | 8/1989 | Rodda . |
| 4,939,903 | 7/1990 | Goddard . |
| 5,020,331 | 6/1991 | Michny . |
| 5,022,230 | 6/1991 | Todack . |
| 5,094,277 | 3/1992 | Grant . |
| 5,097,667 | 3/1992 | Gramkow . |
| 5,123,259 | 6/1992 | Morgan, Sr. . |
| 5,182,918 | 2/1993 | Manz et al. . |
| 5,189,881 | 3/1993 | Miles . |
| 5,189,889 | 3/1993 | Daily . |
| 5,193,351 | 3/1993 | Laukhuf et al. . |
| 5,245,840 | 9/1993 | Van Steenburgh, Jr. . |
| 5,433,081 | 7/1995 | Major et al. ................................ 62/85 |
| 5,535,596 | 7/1996 | Todack . |
| 5,548,966 | 8/1996 | Tinsler . |
| 5,598,714 | 2/1997 | Strout et al. ................................ 62/85 |
| 5,605,054 | 2/1997 | Chen . |
| 5,806,328 | 9/1998 | Muston et al. ............................ 62/149 |

FOREIGN PATENT DOCUMENTS

| | | |
|---|---|---|
| 63022184 | 2/1998 | European Pat. Off. . |
| WO 97/00108 | 1/1997 | WIPO . |

*Primary Examiner*—Henry Bennett
*Assistant Examiner*—Melvin Jones
*Attorney, Agent, or Firm*—Andrew Hicks; Borden Elliot Scott & Aylen

[57] ABSTRACT

An apparatus and method for reclaiming refrigerants is provided. Specifically, the reclamation system provides a decontamination system for removing contaminants from liquid and vapour phases of a refrigerant with an inlet and outlet control system to regulate the flow of refrigerants. The system is preferably operated in conjunction with a refrigeration circuit to provide heating and cooling energy. The system is effective in reclaiming both low and high pressure refrigerants.

20 Claims, 2 Drawing Sheets

REFRIGERANT RECLAMATION SYSTEM

FIELD OF THE INVENTION

The present invention relates to a method and apparatus for reclaiming refrigerants for the purpose of decontamination and storage.

BACKGROUND OF THE INVENTION

In the wake of increasing atmospheric damage as a result of the release of refrigerants to the atmosphere, a growing demand for high efficiency refrigerant reclamation systems has emerged. As a clearer understanding of the nature of the environmental damage caused by refrigerants is developed, the pressure to control the damage continues to rise. In the past, routine practice within the refrigeration industry saw the release of many refrigerants to the environment either accidentally due to appliance failure or on purpose during maintenance. As is well known, research has revealed that such practice contributes to the deterioration of the ozone layer and as a result, apparatuses and methods for the reclamation of refrigerants have been developed.

At the present time, there are a large variety of refrigerants in use, each of which have their own properties adapted or effective within particular refrigeration apparatuses. As a result, there is an increasing demand for highly effective refrigerant reclamation systems having the capabilities of reclaiming the large number of refrigerants found in the industry. With the majority of reclamation systems displaying refrigerant type-specific capacity, the versatility of such a practice has been limited to date.

Typically, recovered refrigerants are contaminated with oil, moisture, acids, non-condensibles and particulates and, as such, it is desirable to employ a reclamation system which can effectively remove these contaminants from a variety of refrigerants. Specifically, there has been a need for a system which provides stringent reclamation capacity for both high and low pressure refrigerants.

To date, the majority of reclamation systems employ a compressor unit in fluid communication with a source refrigerant wherein the compressor facilitates the removal of a refrigerant from its source container. The crankcase of a compressor contains a volume of oil for the lubrication of the moving parts of the compressor and this oil source is routinely open for mixing with the incoming refrigerant. When the source refrigerant directly encounters a compressor unit, some degree of oil contamination is likely where oil contaminates the refrigerant and refrigerant contaminates the oil. As a result of this cross-contamination, regular maintenance of the compressor is required, specifically requiring the oil of the compressor be changed with each new refrigerant being run through the system so as to prevent the mixing of various refrigerants and their contaminants and, secondly, to limit the direct effects of the contaminants on the compressor.

In addition to the precautions necessary to avoid cross-contamination, the physical properties of refrigerants differ to the extent that no single compressor will be compatible with all refrigerants with the efficiency and energy consumption of compressors varying with the type of refrigerant being processed. For example, systems designed for certain refrigerants may preferably operate with open-type compressors. However, open-type compressors are more prone to leaks and require more maintenance than hermetic type compressors.

The efficiency of compressors is also dependent on the velocity and carrying capacity of the system. In an example where a system displaying small interconnecting piping and a small distillation chamber is coupled with a high capacity compressor, contaminants such as moisture will frequently carry over from the distillation chamber.

Still further, other inefficiencies in refrigeration reclamation practice include the removal of oil and non-condensibles. Efforts to remove oil contamination from refrigerants routinely employ oil separators in series with the compressor. As indicated above, a compressor will add oil to the refrigerant which must subsequently be removed by the oil separator, a process which is inherently inefficient. Although a high percentage of the oil is typically removed by an oil separator, some oil is likely to remain in the refrigerant when processed in this manner. Similarly, great difficulty is experienced in the removal of non-condensibles carried through the compressor.

A review of the prior art has revealed a number of references relating to refrigerant recovery. For example, Laukhuf et al. teach of a refrigeration recovery and purification system in U.S. Pat. No. 5,193,351 wherein a refrigerant compressor is connected with a refrigeration unit under service and a refrigerant recovery system. A recovered refrigerant is fed directly to an oil separator for the removal of oil contamination and onward through a pressure regulator to a refrigerant compressor. Upon retrieval via the compressor, the reclaimed refrigerant is at least partially liquefied as it continues along through the condenser, en route to a storage container. In conjunction with the retrieval pathway, a closed pathway from the storage container through a filter apparatus and back to the condenser, operates under the control of a liquid pump, thus purifying and cooling the passing liquid.

In this manner, reclaimed refrigerants directly contact and potentially contaminate the receiving compressor with particulate, acid and moisture. Consequently, frequent maintenance of the compressor unit is likely, and reclamation of a variety of refrigerants limited.

Alternatively, in U.S. Pat. No. 5,245,840 Van Steenburgh Jr., teaches of a refrigerant reclaim method and apparatus comprising two refrigeration pathways wherein a primary pathway includes a compressor and drives the refrigerant through a secondary pathway including an oil separator and a receiving cylinder. The two pathways therein described interact by ways of a first and second heat exchange element. An incoming refrigerant enters the cold side of a first heat exchange element which provides vaporization of the refrigerant. The refrigerant vapor then passes through an oil separator to filter off oil and water. Upon exiting the oil separator, the refrigerant vapor passes through the hot side of the second heat exchange element, thereby becoming liquefied. The liquified refrigerant is subsequently introduced into a storage cylinder. In another embodiment of this reference, the reclaimed refrigerant is recirculated back through the oil separator unit by introducing the refrigerant into the cold side of the first heat exchange element. An alternative method to further purify the reclaimed refrigerant teaches of a method of further cycling the refrigerant from the storage cylinder through a drier unit (liquid).

SUMMARY OF THE INVENTION

It is an objective of the present invention to provide a commercially viable refrigerant reclamation system with the flexibility to reclaim most refrigerants, while providing superior refrigerant purity with less oil, non-condensible, particulate, acid and moisture contamination. It is a further object of the present invention to provide a refrigerant reclamation system which provides simplified operation and less maintenance than existing systems.

It is further an object of the present invention to provide a reclamation system which provides superior purification capabilities including both low and high pressure refrigerants, in addition to functioning at lower operating costs than systems currently available.

In accordance with the invention, an apparatus for reclaiming refrigerants is provided comprising:

a decontamination system for removing contaminants from liquid and vapour phases of a refrigerant, the decontamination system including:

means for producing a vapour phase of refrigerant;

means for removing oil contaminants from the refrigerant in fluid communication with the means for producing a vapour phase of refrigerant;

means for removing moisture contaminants from the refrigerant in fluid communication with the means for removing oil contaminants; and, means for condensing the vapour phase of the refrigerant to a liquid phase in fluid communication with the means for removing moisture contaminants;

an inlet control system in fluid communication with the decontamination system for regulating the flow of contaminated refrigerant into the means for producing a vapour phase of refrigerant; and an outlet control system in fluid communication with the means for condensing the vapour phase for regulating the flow of refrigerant from the decontamination system.

In a preferred embodiment, the apparatus includes a refrigeration system operatively connected to the means for producing a vapour phase of refrigerant and the means for condensing, wherein the refrigeration system provides heating energy to the means for producing a vapour phase of refrigerant and cooling energy to the means for condensing.

It is also preferred that a purging system is provided in fluid communication with the means for condensing, the purging system for removing non-condensible gases from the top of the decontamination system which includes a solenoid valve operatively connected to the refrigeration system for regulating non-condensible gas purging, the solenoid valve responsive to a decrease in the surface area available for condensation within the means for condensing.

A level sensing system for monitoring the level of refrigerant may also be provided to increase or decrease the flow of refrigerant to the distillation chamber.

In a more specific embodiment, the invention also provides an apparatus for reclaiming refrigerants comprising:

a decontamination system for removing contaminants from liquid and vapour phases of the refrigerant, the decontamination system including:

a distillation chamber for producing a vapour phase of refrigerant;

a fractionation column in fluid communication with the distillation chamber for providing a first surface for condensing oil contaminants from the refrigerant;

an oil separator in fluid communication with the fractionation column for separating oil contaminants from the refrigerant;

a vapour dryer in fluid communication with the oil separator for removing vaporized moisture contaminants from the refrigerant;

a chilling unit in fluid communication with the vapour dryer for condensing the vapour phase of the refrigerant to a liquid phase;

a liquid dryer in fluid communication with the chilling unit for removing liquid moisture contaminants from the liquid phase of refrigerant;

an inlet control system for regulating the flow of contaminated refrigerant into the distillation chamber;

an outlet control system in fluid communication with the liquid dryer for regulating the flow of refrigerant from the decontamination system;

heat exchange system for providing heating energy to the distillation chamber and cooling energy to the chilling unit, the heat exchange system for transferring refrigerant through the decontamination system.

Preferably, the apparatus also includes a recovery system in fluid communication with the decontamination system and outlet control system for recovery or delivery of refrigerant to sections of the decontamination system and outlet control system which includes a recovery unit operatively connected to a suction accumulator.

The invention also provides a method for reclaiming refrigerants comprising the steps of: within a decontamination system:

a. producing a vapour phase of refrigerant within a distillation chamber;

b. removing oil contaminants from the vapour phase of the refrigerant;

c. removing vaporized moisture contaminants from the vapour phase of the refrigerant;

d. condensing the vapour phase of the refrigerant to form a liquid phase of the refrigerant;

e. removing liquid moisture contaminants from the liquid phase of the refrigerant.

In an alternate embodiment of the method, the method includes purging non-condensible gases from the decontamination system prior to step d). A further embodiment of the method also provides that heating energy for step a) and cooling energy for step d) is provided by a refrigeration system.

BRIEF DESCRIPTION OF THE DRAWINGS

These and other features of the invention will be more apparent from the following description in which reference is made to the appended drawings wherein.

DETAILED DESCRIPTION OF THE INVENTION

Figure 1:
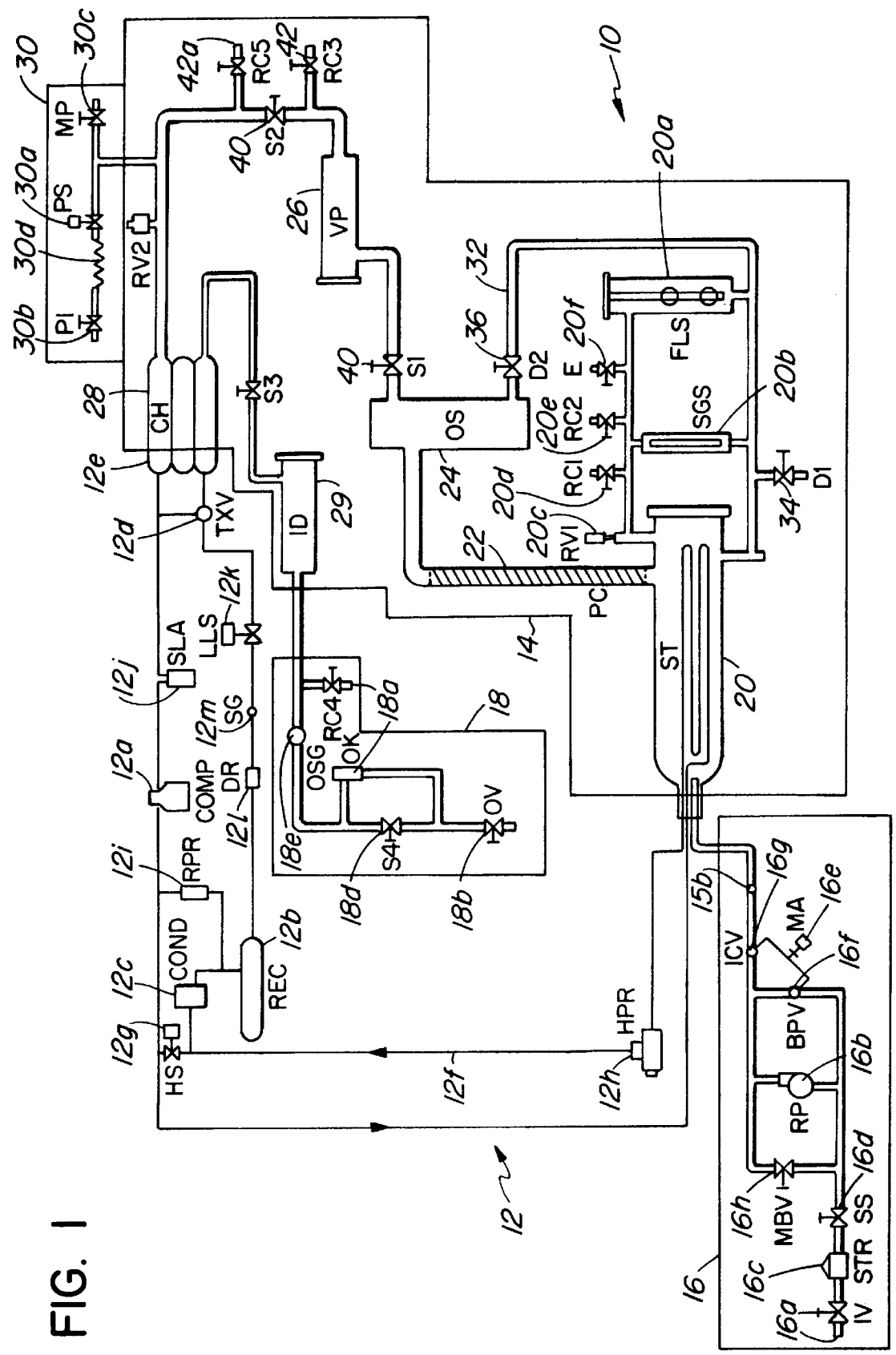
FIG. 1 is a schematic drawing of the reclamation system in accordance with the invention; and, FIG. 2 is a schematic drawing of the recovery unit in accordance with the invention.

With reference to FIG. 1, an apparatus 10 for the reclamation of high and low pressure refrigerants is described. As shown in FIG. 1, reclamation system 10 generally comprises a heat exchange system 12, a decontamination system 14, an inlet control system 16, purge system 30 and an outlet control system 18. The apparatus generally enables the handling and cleaning of refrigerant without the refrigerant coming into direct contact with a compressor. As will be described in greater detail below, contaminated refrigerant is introduced into the decontamination system 14 through the inlet control system 16 whereupon the contaminated refrigerant is subjected to various cleansing processes such as heating, fractionation, oil separation, vapour drying, condensation, liquid drying, and non-condensible gas purging to remove contaminants such as acids, liquids, oil, non-condensible gases and particulates from the refrigerant. De-contaminated refrigerant is removed through the outlet control system. The flow of refrigerant through the decontamination system is controlled by the heat exchange system 12 which provides both heating and cooling energy to the refrigerant to facilitate its movement through the inlet control 16, decontamination 14 and outlet control 18 systems. Movement of refrigerant is also assisted by gravity.

The Heat Exchange System 12

The heat exchange system 12 is a refrigerant circuit generally including a compressor 12a, a receiver 12b, air-cooled condenser 12c, thermostatic expansion valve 12d and an evaporator 12e. A second condenser circuit consisting of a coil of copper tubing 12f is fitted to the inside of the distillation chamber 20 and is connected in series to the air cooled condenser 12c. A hot gas solenoid 12g is provided to allow hot gas from the compressor 12c to by-pass the second condenser circuit 12f if desired, to assist in initial loading of the distillation chamber 20 of the decontamination system 14 (described below). A head pressure regulator 12h in the second condenser circuit 12f restricts the flow of hot-gas through the distillation chamber 20 which is controlled in conjunction with a receiver pressure regulator 12i to maintain the distillation-chamber temperature at a minimum setting. The receiver pressure regulator 12i is used to by-pass the condenser allowing hot gas to flow directly to the receiver 12b to maintain positive flow to the thermal expansion valve 12d. The heat exchange circuit 12 is also provided with a suction line accumulator 12j for preventing liquid refrigerant from reaching the compressor 12a, a liquid line solenoid 12k to protect the compressor 12a from liquid flooding, a drier 12l for removing moisture from the heat exchange circuit 12 and a condensing unit sight glass 12m for observing liquid levels in the heat exchange system 12.

Generally, the heat exchange system 12 operates to remove heat from the chilling unit 28 and supply heat to the distillation chamber 20.

Inlet Control System 16

The inlet control system controls the entry of contaminated refrigerant into the reclamation system 10. A tank (not shown) containing contaminated refrigerant is attached to inlet piping at inlet valve 16a. Inlet valve 16a is opened and contaminated refrigerant is pumped into the distillation chamber 20 by a refrigerant pump 16b. A strainer 16c may also be provided to prevent particulate matter from entering the system. A strainer shut-off valve 16d is provided to isolate the strainer 16c for cleaning. The inlet control system 16 may also be provided with a motorized actuator 16e which is inter-linked between an inlet control valve 16g and by-pass valve 16f. Preferably, the distillation chamber 20 is provided with high and low level control switches in the distillation chamber 20 which are operably connected to the actuator 16e to close the inlet control valve 16g when the level in the distillation chamber 20 reaches a predetermined level and simultaneously open the by-pass valve 16f. This system allows the refrigerant pump 16b to operate continuously in a by-pass mode while the inlet control valve 16g is closed or partially closed. Similarly, once the level of refrigerant in the distillation chamber 20 drops to a pre-determined level, the inlet control valve 16g will open while closing the by-pass valve 16f thereby allowing more refrigerant to be pumped into the distillation chamber 20. A manual by-pass valve 16g may also be provided for by-passing the refrigeration pump 16b if system conditions do not require active loading or for cleaning the system 10.

It is preferable that the refrigerant pump 16b is operated continuously to minimize the risk of loss of a liquid head on the refrigerant pump 16b.

Refrigerant Decontamination System 14

The refrigerant decontamination system 14 includes the distillation chamber 20, a fractionation column 22, an oil separator 24, a vapour dryer system 26, chilling unit 28, liquid dryer system 29 and purge system 30. The distillation chamber 20 receives liquid contaminated refrigerant from the inlet control system 16 as described above.

As indicated above, it is preferred that the distillation chamber 20 is provided with a float level sensor 20a which signals the motor actuator 16e to either continue filling or stop filling the distillation chamber 20. A sight glass 20b is provided for visual inspection of the refrigerant levels within the distillation chamber 20. Still further, the distillation chamber 20 is provided with a relief valve 20c for pressure release in the event of excessive pressure build-up, recovery valves 20d and 20e for connection to the recovery circuit (detailed below) and an equalizer valve 20f which may be connected to the source tank of refrigerant at the inlet for pressure equalization between the distillation chamber 20 and source tank.

Upon heating, the liquid refrigerant in the distillation chamber 20 is vaporized whereby it passes through the fractionation column 22. The fractionation column is typically a packed column and, accordingly, provides a large surface area for oil and other contaminants to collect and drain back to the distillation chamber 20. Upon exiting the fractionation column 22, refrigerant enters an oil separator 24 for further oil removal. The oil separator 24 is typically provided with a coalescing type filter media which removes remaining oil particles within the refrigerant vapour. As shown in FIG. 1, the oil filter may also be provided with an oil drain system 32 which allows for captured oil to drain by gravity, predominantly to the distillation chamber 20 whereby it can be subsequently be drained from the system through drain valve 34. A second drain valve 36 may also be provided to close the oil drain system 32 from the oil separator 24.

Upon exiting the oil separator 24, refrigerant vapour is dried of moisture in vapour drier 26. The vapour drier 26 is typically an activated carbon/desiccant type drier. The vapour drier 26 may be isolated from the system 14 by shut-off valves 40. A recovery valve 42 is provided to enable removal of refrifgerant gas from the system if desired. Upon exiting the vapour drier 26, refrigerant gas enters the chilling unit 28 wherein the refrigerant gas is cooled and condensed to a liquid phase. Upon exiting the chilling unit 28, the liquid refrigerant is further dried within liquid drier 29 to further assist in removing remaining moisture in the refrigerant. The decontaminated refrigerant then enters the outlet control system 18 for collection and subsequent re-use.

In a preferred embodiment, the decontamination system is also provided with a purging system 30 for removal of non-condensable contaminants from the reclamation system such as $N_2$, $NO_2$, and $O_2$. With the chilling unit 28 at the high point of the decontamination system 14, during operation of the reclamation system, non-condensable gases will accumulate in the chilling unit 28, thereby gradually reducing the effective surface area available for cooling the refrigerant gas. As a result of a reduction in surface area for cooling, the suction pressure within the heat exchange system 12 drops. At a pre-determined suction pressure, the purge system 30 energizes purge solenoid 30a adjacent the chilling unit 28. The solenoid 30a opens, allowing non-condensible gases to escape to the atmosphere. As the suction pressure subsequently returns to normal levels, the purge solenoid 30a is de-energized, thus closing and terminating the purge cycle. In order to prevent back-flow leakage through the purge solenoid 30a, valve 30b connected to capillary tubing 30d is employed.

The purge cycle may also be operated under the control of a distillation chamber thermostat, pressure control device and timer. Specifically, the purge cycle will not be initiated unless the conditions of the distillation chamber 20 meet pre-determined temperature, pressure and liquid levels.

Under this control, the purge solenoid 30a will cycle as required when non-condensibles are present. In the case where low pressure refrigerants are introduced into system 10, the temperature of the distillation chamber 20 has a direct influence on the purging process of the invention. Under such circumstances an external heater (not shown) may be attached to distillation chamber 20 to raise the temperature and pressure within the distillation chamber 20. Typically, the auxiliary heater would be used to set a temperature approximately 10 degrees Fahrenheit higher than the boiling point of the low pressure refrigerant or slightly above ambient temperature which ever is higher. This procedure allows the suction pressure within the heat exchange system 12 to stabilize in the preferred pressure range of between 20 and 50 psig. If a stabilized pressure in this range is not established then a manual purge procedure is necessary. The manual purge procedure would typically involve opening valve 30b or purge valve 30c until liquid refrigerant appears, thus clearing the purge system of non-condensable gases. The pressure of the distillation chamber 20 is greater than 0 psig for manual purging.

Condensed refrigerant from the chilling unit 28 is further processed within liquid drier 29, the condensed refrigerant flowing through the liquid drier under the force of gravity.

Outlet Control System 18

The outlet control system 18 includes an outlet regulator 18a, an outlet valve 18b, a recovery valve 18c, shut-off valve 18d and outlet sight glass 18e. The outlet regulator 18a regulates the pressure at outlet valve 18b to control the flow of reclaimed refrigerant to a receiving cylinder (not shown) and to prevent violent release of refrigerant from the system upon opening outlet valve 18b.

The size of the distillation chamber 20 and the corresponding interconnecting refrigeration tubing are preferably of a sufficient size so as to reduce the carry-over of contaminants from the distillation chamber 20 for a given volume being processed while also extending the operating time between draining procedures necessary for removing oil and particulate from the system (ie. most such contaminants accumulate in the distillation chamber). It is further preferred that the interconnecting tubing used in association with reclamation system 10 be standard L type refrigeration tubing.

Recovery System

Figure 2:
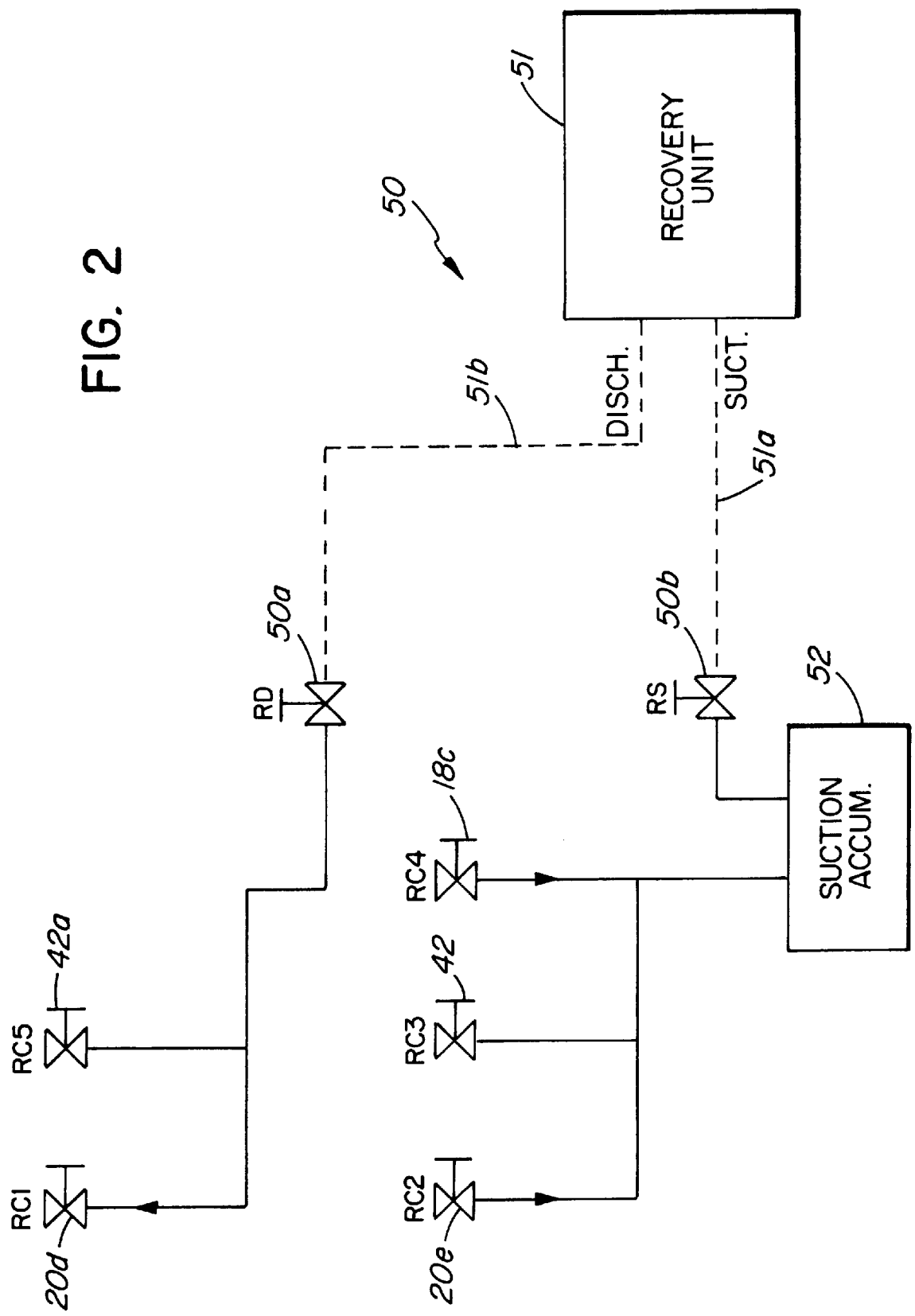

With reference to FIG. 2, a recovery system 50 may also be configured to the system to enhance the efficiency of the operation of the system and enable the evacuation of specific sections of the system 10. The recovery system 50 includes a recovery unit 51 having a suction end 51a and discharge end 51b for moving refrigerant. The system 50 is provided with a recovery discharge valve 50a and a recovery suction valve 50b for isolation of the respective suction and discharge sections of the system 50. A suction accumulator 52 is provided for protecting the recovery unit 51 from liquid refrigerant. The recovery system 50 is configured to the reclamation system 10 to recovery valves 20d, 42a, 20e, 42 and 18c. Accordingly, through appropriate manipulation of the recovery and shut-off valves of the system, refrigerant may be specifically withdrawn or added to specific sections of the system 10 as desired.

Operation

As indicated above, the refrigerant reclamation system 10 may be used to purify both high and low pressure refrigerants and is preferably used with R-11, R-113, R-114, R-12, R-123, R-134a, R-22, R-401A. R-401B, R-402A, R-402B, R-404A, R-404A, R-408A, R-409A, R-500, R-502, R-507 type refrigerants. The ability of the reclamation system 10 to reclaim a plurality of refrigerants is dependent on the controlled processing of the internal refrigerant within the heat exchange system 12. It is preferred that the two-way heat exchange circuit 12 contains an R-22 type refrigerant.

Contaminated refrigerant is pumped into the distillation chamber 20 by the refrigerant pump 16b. When the level of liquid refrigerant within the distillation chamber 20 reaches a predetermined level (typically ¾ full), the float switch 20a signals the motor actuator 16e to change position and begin to close the inlet control valve 16g while at the same time opening the pump by-pass valve 16f which allows the refrigerant pump 16b to continue running but in a by-pass mode. The actuator 16e may not go to the fully closed position unless the level continues to rise in the distillation chamber 20. When the level in the distillation chamber drops below the bottom float setting, the motor actuator 16e will begin to open the inlet control valve and close the by-pass valve 16f allowing more contaminated refrigerant to be pumped into the distillation chamber 20. The actuator 16e may not go to the fully open position unless the level in the still continues to drop. The level in the distillation chamber will be maintained in this manner during the reclamation process as long as there is a supply of contaminated refrigerant and provides a more stabilized level of refrigerant in the still.

Typically, the actuator 16e is slow-moving taking approximately 90 seconds to cause the inlet control valve 16g and by-pass valve 16f to fully open or close.

The distillation chamber 20 is heated with the condenser coil 12f mounted internally and, as indicated above, is in series with the air-cooled condenser 12c. Hot gas from the compressor 12a is routed to the distillation chamber 20. Heat remaining in the refrigerant after passing through the distillation chamber 20 is removed by the air-cooled condenser 12c. The by-pass solenoid valve 12g is manually operated in the event that it is desired to operate the system without heat to the distillation chamber 20. Optionally, an auxiliary heating element (not shown) may be provided to provide additional distillation chamber 20 heating if necessary. The auxiliary heating element is preferably an electric heating element strapped to the outside of the distillation chamber 20. Typically, the distillation chamber 20 would be provided with a thermostat, set at approximately 75 degrees F. or slightly above ambient temperature, whichever is higher in order to provide a positive flow of processed refrigerant to the outlet system 18 resulting from a pressure increase within the distillation chamber 20. An increased pressure within the distillation chamber is particularly useful when reclaiming low pressure refrigerants. Furthermore, the auxiliary heater provides additional heat to the distillation chamber 20 during the pump-out phase, that is the portion of a reclaim cycle when liquid levels in the distillation chamber drop below the low level float switch 20a) and/or the recovery phase when residual gases is removed to the recovery unit.

The flow of refrigerant through the system is created by three different means. Firstly, the refrigerant flows into the distillation chamber 20 because of a pressure difference created by the refrigerant pump 16b. Secondly, refrigerant vapour flows from the distillation chamber 20 to the chilling unit 28 as a result of the pressure difference created by the temperature difference between the two locations. And thirdly, condensed refrigerant flows from the chilling unit 28 to the receiving cylinder by gravity.

It is preferred that the system 10 of the invention be operated in an indoor environment.

We claim:

1. An apparatus for reclaiming refrigerants comprising:
   a decontamination system for removing contaminants from liquid and vapour phases of a refrigerant, the decontamination system including:
   means for producing a vapour phase of refrigerant;
   means for removing oil contaminants from the refrigerant in fluid communication with the means for producing a vapour phase of refrigerant;
   means for removing moisture contaminants from the refrigerant in fluid communication with the means for removing oil contaminants; and,
   means for condensing the vapour phase of the refrigerant to a liquid phase in fluid communication with the means for removing moisture contaminants;
   an inlet control system in fluid communication with the decontamination system for regulating the flow of contaminated refrigerant into the means for producing a vapour phase of refrigerant; and
   an outlet control system in fluid communication with the means for condensing the vapour phase for regulating the flow of refrigerant from the decontamination system.

2. An apparatus as in claim 1 further comprising a refrigeration system operatively connected to the means for producing a vapour phase of refrigerant and the means for condensing, wherein the refrigeration system provides heating energy to the means for producing a vapour phase of refrigerant and cooling energy to the means for condensing.

3. An apparatus as in claim 2 wherein the means for removing oil contaminants from the refrigerant includes a fractionation column and an oil separator.

4. An apparatus as in claim 2 wherein the means for removing moisture contaminants from the refrigerant is a vapour dryer.

5. An apparatus as in claim 2 further comprising means for removing liquid moisture contaminants from the refrigerant in fluid communication between the means for condensing and the outlet control system.

6. The apparatus as in claim 2 further comprising a purging system in fluid communication with the means for condensing, the purging system for removing non-condensible gases from the top of the decontamination system.

7. The apparatus as in claim 6 wherein the purging system includes a solenoid valve operatively connected to the refrigeration system for regulating non-condensible gas purging, the solenoid valve responsive to a decrease in the surface area available for condensation within the means for condensing.

8. An apparatus as in claim 2 wherein the means for producing a vapour phase is a distillation chamber and includes level sensing means for monitoring the level of refrigerant in the distillation chanber, the level sensing means providing a feedback signal to the inlet control system to increase or decrease the flow of refrigerant to the distillation chamber.

9. An apparatus for reclaiming refrigerants comprising:
   a decontamination system for removing contaminants from liquid and vapour phases of the refrigerant, the decontamination system including:
   a distillation chamber for producing a vapour phase of refrigerant;
   a fractionation column in fluid communication with the distillation chamber for providing a first surface for condensing oil contaminants from the refrigerant;
   an oil separator in fluid communication with the fractionation column for separating oil contaminants from the refrigerant;
   a vapour dryer in fluid communication with the oil separator for removing vaporized moisture contaminants from the refrigerant;
   a chilling unit in fluid communication with the vapor dryer for condensing the vapour phase of the refrigerant to a liquid phase;
   a liquid dryer in fluid communication with the chilling unit for removing liquid moisture contaminants from the liquid phase of refrigerant;
   an inlet control system for regulating the flow of contaminated refrigerant into the distillation chamber;
   an outlet control system in fluid communication with the liquid dryer for regulating the flow of refrigerant from the deconcontamination system;
   heat exchange system for providing heating energy to the distillation chamber and cooling energy to the chilling unit, the heat exchange system for transferring refrigerant through the decontamination system.

10. The apparatus as in claim 9 further comprising a purging system in fluid communication with the chilling unit for removing non-condensible gases from the top of the decontamination system.

11. The apparatus as in claim 10 wherein the wherein the purging system includes a solenoid valve operatively connected to the refrigeration system for regulating non-condesible gas purging, the solenoid valve responsive to a decrease in the surface area available for condensation within the chilling unit.

12. The apparatus as in claim 9 wherein the distillation chamber includes level sensing means for monitoring the level of refrigerant in the distillation chamber, the level sensing means providing a feedback signal to the inlet control system to increase or decrease the flow of refrigerant to the distillation chamber.

13. The apparatus as in claim 12 wherein the inlet control system includes a refrigerant pump for pumping refrigerant to the distillation chamber, the inlet control system also including means for by-passing the refrigerant pump.

14. The apparatus as in claim 9 wherein the oil separator and distillation chamber further comprise an oil draining system in fluid communication with the lower portions of the oil separator and distillation chamber.

15. The apparatus as in claim 9 wherein the outlet control system includes means for regulating the flow of refrigerant from the outlet control system to a storage device.

16. The apparatus as in claim 9 further comprising a recovery system in fluid communication with the decontamination system and outlet control system for recovery or delivery of refrigerant to sections of the decontamination system and outlet control system.

17. An apparatus as in claim 16 wherein the recovery system includes a recovery unit operatively connected to a suction accumulator.

18. A method for reclaiming refrigerants comprising the steps of: within a decontamination system:
   a. producing a vapour phase of refrigerant within a distillation chamber;

b. removing oil contaminants from the vapour phase of the refrigerant;

c. removing vaporized moisture contaminants from the vapour phase of the refrigerant;

d. condensing the vapour phase of the refrigerant to form a liquid phase of the refrigerant;

e. removing liquid moisture contaminants from the liquid phase of the refrigerant.

19. A method as in claim 18 further comprising purging non-condensible gases from the decontamination system prior to step d).

20. A method as in claim 18 wherein heating energy for step a) and cooling energy for step d) is provided by a refrigeration system.

* * * * *